Nov. 10, 1931.  J. HOJNOWSKI  1,831,175
AIRPLANE
Filed May 29, 1930  2 Sheets-Sheet 1

Inventor
Jakob Hojnowski

Nov. 10, 1931.  J. HOJNOWSKI  1,831,175
AIRPLANE
Filed May 29, 1930  2 Sheets-Sheet 2

Inventor
Jakob Hojnowski

Patented Nov. 10, 1931

1,831,175

UNITED STATES PATENT OFFICE

JAKOB HOJNOWSKI, OF NEKOOSA, WISCONSIN

AIRPLANE

Application filed May 29, 1930. Serial No. 456,927.

This invention relates to improvements in airplanes, particularly planes of the glider type, and it is the principal object of my invention to provide a plane equipped with a plurality of sails and a stabilizing wing or plane adapted to be set at the required and suitable angles to keep the plane sailing through the air for a considerable time.

Another object of my invention is the provision of a plane the wing of which is constructed in a novel manner by an open frame work covered by canvas or similar suitable material.

A further object of my invention is the provision of an airplane of this type which is simple and inexpensive in construction, yet durable and efficient in its operation.

A still further object of my invention is the provision of an airplane equipped with a novel and improved front landing gear adapted to positively absorb all shocks experienced during starting and landing on uneven ground.

These and other objects and advantages of my invention will become more fully apparent as the description thereof proceeds, and will then be specifically defined in the appended claims.

In the accompanying drawings forming a material part of this disclosure:

Figure 1:
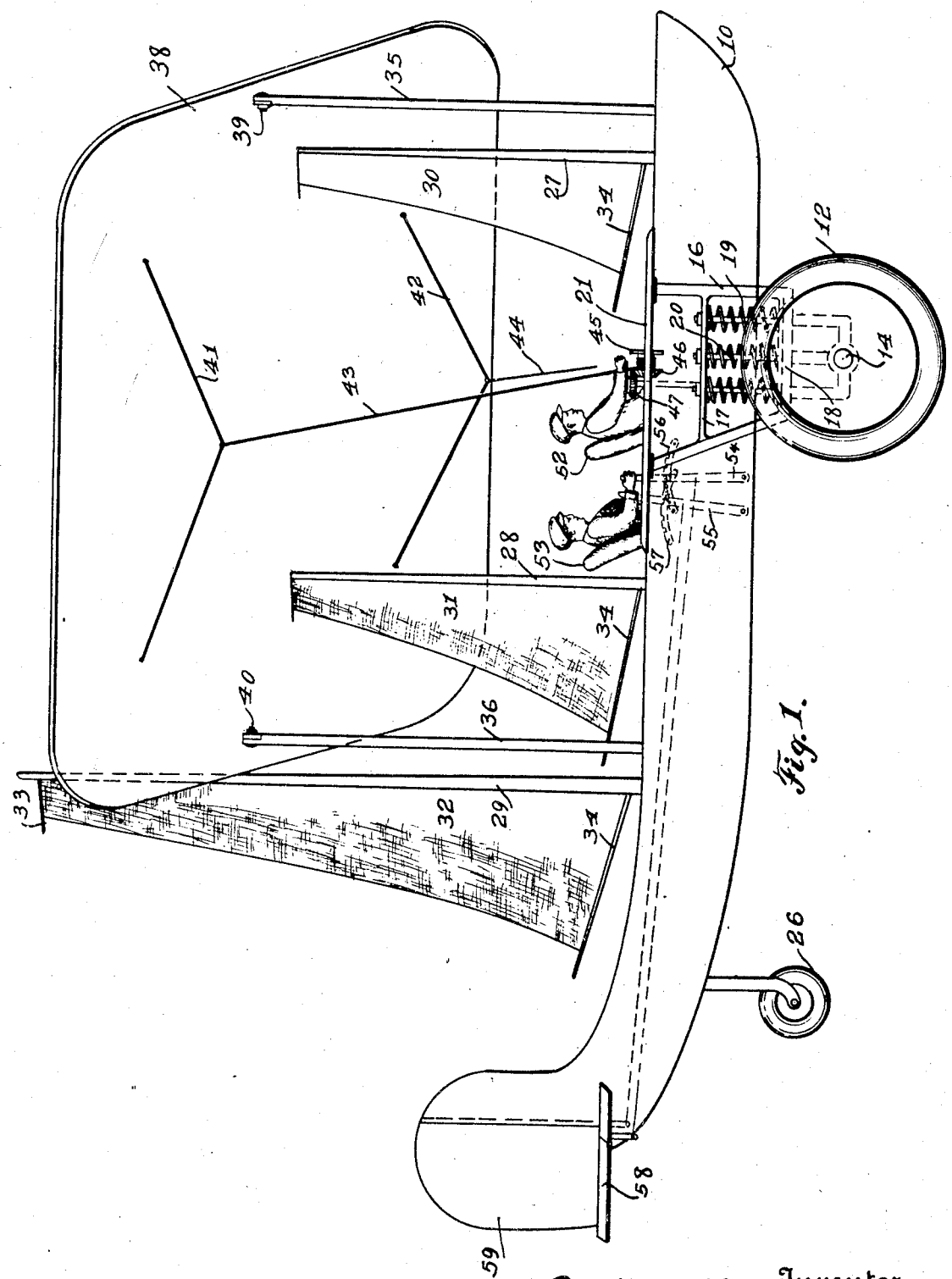
Fig. 1 is a side elevation of a flying machine constructed according to my invention.
Figure 2:
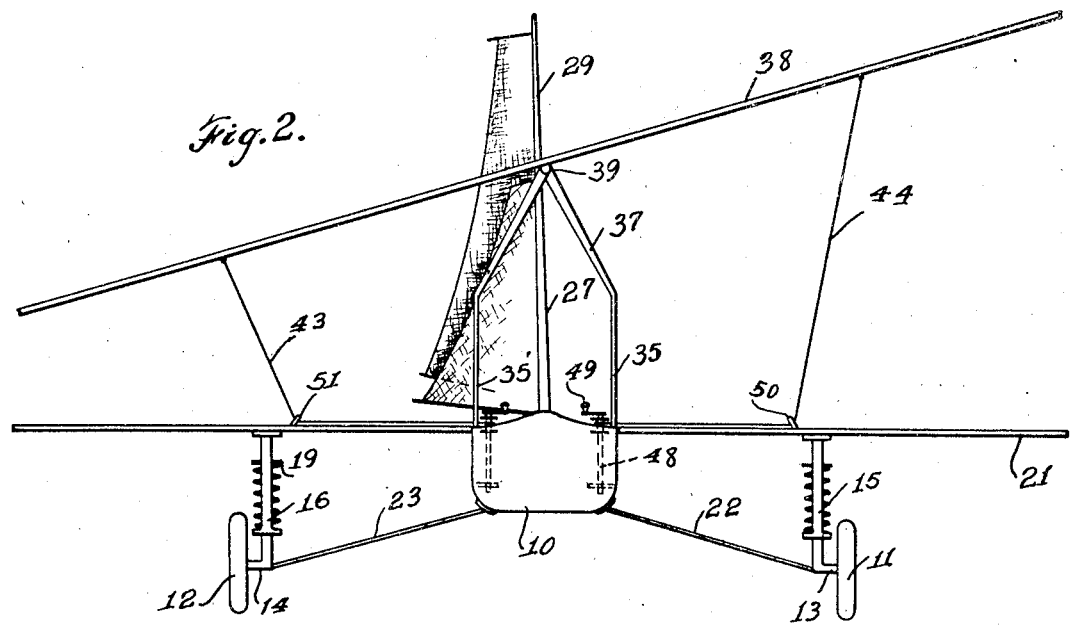
Fig. 2 is a front elevation thereof.
Figure 3:
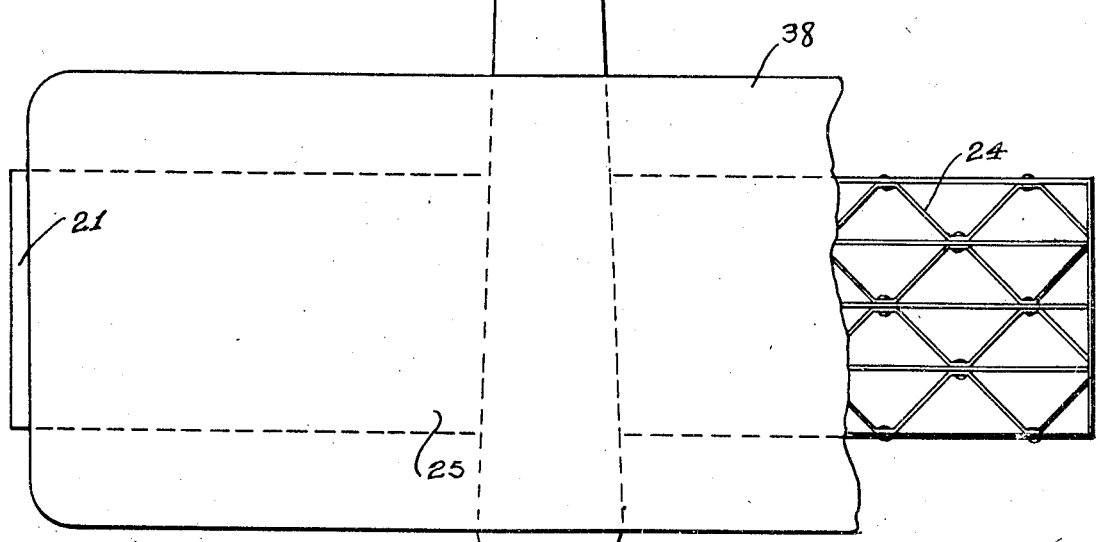
Fig. 3 is a top plan view.

As illustrated, the body 10 of an airplane preferably of the glider type is equipped at its front with a landing gear composed of wheels 11 and 12 on axles 13 and 14 supporting frames 15, 16, between the cross-bars 17, 18 of which springs 19 are wound about rods 20 forming part of the frame bars, while the ends of frames 15 and 16 are secured to the underside of a plane or wing 21, laterally extending from the sides of the plane near the front part thereof.

Braces 22, 23, brace the frames and wheel axles against the body, and the wing or wings 21 are composed of an open frame work 24 covered by canvas 25. The rear part of body 10 is equipped with a landing gear generally designated 26.

The airplane is equipped with masts 27, 28, 29 for spreading of sails 30, 31, 32 between the spars 33, and 34 respectively.

A pair of front posts 35, 35' and rear posts 36 have their upper parts converging, as at 37, and at their meeting points a stabilizer plane 38 is pivotally attached as at 39, 40, to the lower face of which pairwise arranged cables 41 and 42 are attached ending in cables 43, 44 respectively, wound about drums 45, the shafts of which carry bevel gears 46 in mesh with bevel gears 47 on the vertical shafts 48 suitably arranged within the body 10 and adapted to be operated by means of hand wheels 49 to operate the cables 43, 44 which intermediate their ends are guided through suitable eyes 50, 51 on the wing 21.

These cables and hand wheels are operated from a front seat 52, while the steering of the plane is effected from the rear seat 53 by means of levers 54, 55, adapted to be locked in the well known manner by pawls engaging the toothed segments 56, 57 to operate the horizontal rudders 58 and vertical rudder 59 respectively.

The operation of my device will be entirely clear from the above description by simultaneous inspection of the drawings, by suitably tilting the stabilizing wing and adjusting the rudders and sails, the glider may be guided through the air for a considerable time.

It will be understood that I have described the preferred form of my airplane only and that I may make such changes as come within the scope of the appended claims without departure from my invention.

Having thus described my invention what I claim as new and desire to secure by Letters Patent is:

1. In an airplane of the glider type, having a supporting wing or plane, a front starting and landing gear including wheels comprising a frame attached to said plane and the axle of the landing gear wheels, a plurality of rods in said frame, cross bars to which said rods are secured, and springs wound about said rods between the cross-bars and a rear landing gear for the plane.

2. In a front starting and landing gear for flying machines, supports on the fuselage of the machine extending laterally therefrom, frames suspended from said supports, cross bars forming part of said frames, axles journaled in the lower part of said frames, rods forming part of said frame between the cross-bars thereof and springs wound about said rods between said cross bars.

Signed at Nekcosa, in the county of Wood and State of Wisconsin, this 23rd day of May, A. D. 1930.

JAKOB HOJNOWSKI.